United States Patent
Chen et al.

(10) Patent No.: US 12,373,638 B2
(45) Date of Patent: Jul. 29, 2025

(54) DOCUMENT EDITING METHOD AND APPARATUS, DEVICE, AND STORAGE MEDIUM

(71) Applicant: BEIJING ZITIAO NETWORK TECHNOLOGY CO., LTD., Beijing (CN)

(72) Inventors: Wei Chen, Beijing (CN); Guangping Xie, Beijing (CN); Xuejia Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/458,698

(22) Filed: Aug. 30, 2023

(65) Prior Publication Data

US 2023/0409814 A1    Dec. 21, 2023

Related U.S. Application Data

(63) Continuation of application No. PCT/CN2022/078247, filed on Feb. 28, 2022.

(30) Foreign Application Priority Data

Mar. 1, 2021   (CN) .................. 202110227796.4

(51) Int. Cl.
*G06F 17/00*     (2019.01)
*G06F 3/0482*    (2013.01)
(Continued)

(52) U.S. Cl.
CPC .......... *G06F 40/166* (2020.01); *G06F 3/0482* (2013.01); *G06F 40/106* (2020.01)

(58) Field of Classification Search
CPC .. G06F 3/0484; G06F 3/04842; G06F 40/134; G06F 40/106; G06F 40/166;
(Continued)

(56) References Cited

U.S. PATENT DOCUMENTS

2009/0106674 A1    4/2009  Bray et al.
2013/0007671 A1    1/2013  Hammontree et al.
(Continued)

FOREIGN PATENT DOCUMENTS

CN      103294693 A     9/2013
CN      108182289 A     6/2018
(Continued)

OTHER PUBLICATIONS

International Search Report and Written Opinion, International Patent Application No. PCT/CN2022/078247, Apr. 29, 2022, with English translation (10 pages).
(Continued)

*Primary Examiner* — Jason T Edwards
(74) *Attorney, Agent, or Firm* — Astute IP Law Group

(57) ABSTRACT

A document editing method and apparatus, a device, and a storage medium are provided. The method comprises: in response to a trigger command received in a first document interface, and displaying a content panel in the first document interface, the content panel displaying at least one document unit, and the document unit comprising part of the content of a second document; and in response to a selection operation on the document unit in the content panel, displaying the document unit in a preset mode in the first document interface.

20 Claims, 4 Drawing Sheets

In response to a triggering command received in an interface of a first document, display a content panel in the interface of the first document — 110

In response to a selection operation on a document unit in the content panel, display the document unit in the interface of the first document in a preset mode — 120

(51) Int. Cl.
*G06F 40/106* (2020.01)
*G06F 40/166* (2020.01)

(58) Field of Classification Search
CPC ............. G06F 3/0482; G06F 16/24575; G06F 40/186; G06F 40/131; G06F 16/178; G06F 40/197; G06F 3/0488; G06F 3/04855; G06F 3/0485; G06F 3/0481; G06F 3/0483; G06F 3/04883; G06F 3/04847; G06F 9/451
USPC ........................................................ 715/255
See application file for complete search history.

(56) References Cited

U.S. PATENT DOCUMENTS

| | | | |
|---|---|---|---|
| 2014/0149858 A1* | 5/2014 | Vecera | G06F 40/103 715/273 |
| 2016/0283447 A1* | 9/2016 | Masterson | G06Q 10/107 |
| 2017/0220567 A1 | 8/2017 | Masson et al. | |
| 2018/0189256 A1* | 7/2018 | Gonzalez | G06F 40/134 |
| 2019/0258949 A1* | 8/2019 | Reyes | G06Q 10/06315 |
| 2022/0075932 A1 | 3/2022 | Lin et al. | |
| 2022/0083215 A1 | 3/2022 | Xia | |
| 2023/0350872 A1 | 11/2023 | Lin | |

FOREIGN PATENT DOCUMENTS

| | | | |
|---|---|---|---|
| CN | 108292302 | A | 7/2018 |
| CN | 109445657 | A | 3/2019 |
| CN | 110162758 | A | 8/2019 |
| CN | 110928460 | A | 3/2020 |
| CN | 111858518 | A | 10/2020 |
| CN | 112163102 | A | 1/2021 |
| CN | 112328853 | A | 2/2021 |
| CN | 114997116 | B | 3/2025 |
| JP | H08190543 | A | 7/1996 |
| JP | 2003006186 | A | 1/2003 |
| JP | 2009223717 | A | 10/2009 |

OTHER PUBLICATIONS

Office Action issued in Chinese Patent Application No. 202110227796. 4, Feb. 27, 2024, with English translation (22 pages).
Office Action issued in Chinese Patent Application No. 202110227796. 4, May 11, 2024, with English translation (20 pages).
Notice of Reasons for Refusal for Japanese Patent Application No. 2023-553232, mailed on Nov. 26, 2024, 11 pages.
Tanase T., et al., "Paper Creation Support Based on Portion Reference and Citation of Digital Contents", 75th (Heisei 25(2013)) National Conferences Lecture Collected Papers (1), General Incorporated Foundation Information Processing Society of Japan, Mar. 6, 2013, 1-623 to 1-624 pages, 4 pages.
Decision of Refusal for Japanese Patent Application No. 2023-553232, mailed on Jun. 3, 2025, 6 pages.

* cited by examiner

DOCUMENT EDITING METHOD AND APPARATUS, DEVICE, AND STORAGE MEDIUM

This application is a continuation application of International Application No. PCT/CN2022/078247, filed on Feb. 28, 2022, which claims the priority to Chinese Patent Application No. 202110227796.4 titled "DOCUMENT EDITING METHOD AND APPARATUS, DEVICE, AND STORAGE MEDIUM", filed on Mar. 1, 2021 with the China National Intellectual Property Administration (CNIPA), both of which are incorporated herein by reference in their entireties.

FIELD

The present disclosure relates to the technical field of electronic devices, and in particular to a method and an apparatus for document editing, a device and a storage medium.

BACKGROUND

Usually, when a user wants to add a piece of content of other document to a currently-edited document, the user has to search in a target document for the expected content, copy the content, and finally paste the content into the currently-edited document.

The defects in such a solution lie in that it is required to first find and open the target document before acquiring the expected content, an editing operation performed by the user on the currently-edited document would be interrupted, reducing experience of the user.

SUMMARY

A method and an apparatus for document editing, a device and a storage medium are provided according to embodiments of the present disclosure.

In a first aspect, a method for document editing is provided according to an embodiment of the present disclosure. The method includes:
  in response to a triggering command received in an interface of a first document, displaying a content panel in the interface of the first document, where the content panel displays at least one document unit, and the document unit includes a part of content of a second document; and
  in response to a selection operation on the document unit in the content panel, displaying the document unit in the interface of the first document in a preset mode.

In a second aspect, an apparatus for document editing is further provided according to an embodiment of the present disclosure. The apparatus includes:
  a content panel display module, configured to, in response to a triggering command received in an interface of a first document, display a content panel in the interface of the first document, where the content panel displays at least one document unit, and the document unit includes a part of content of a second document; and
  a document unit display module, configured to, in response to a selection operation on the document unit in the content panel, display the document unit in the interface of the first document in a preset mode.

In a third aspect, an electronic device is further provided according to an embodiment of the present disclosure. The electronic device includes:

one or more processing apparatuses; and
a memory, configured to store one or more instructions, where
the one or more instructions, when being executed by the one or more processing apparatuses, cause the one or more processing apparatuses to perform the method for document editing according to the embodiment of the present disclosure.

In a fourth aspect, a computer-readable storage medium is further provided according to an embodiment of the present disclosure. The computer-readable storage medium stores a computer program. The computer program, when being executed by a processing apparatus, performs the method for document editing according to the embodiment of the present disclosure.

In a fifth aspect, a computer program product is further provided according to an embodiment of the present disclosure. The computer program product includes a computer program carried on a computer-readable medium. The computer program includes program codes for performing the method for document editing according to the embodiment of the present disclosure.

According to the embodiments of the present disclosure, in response to the triggering command received in the interface of the first document, the content panel is displayed in the interface of the first document, the content panel displays at least one document unit, and the document unit includes a part of content of the second document.

Then, in response to the selection operation on the document unit in the content panel, the document unit is displayed in the interface of the first document in the preset mode, and the preset mode is different from a manner in which the content in the first document is displayed.

DETAILED DESCRIPTION

Figure 1:
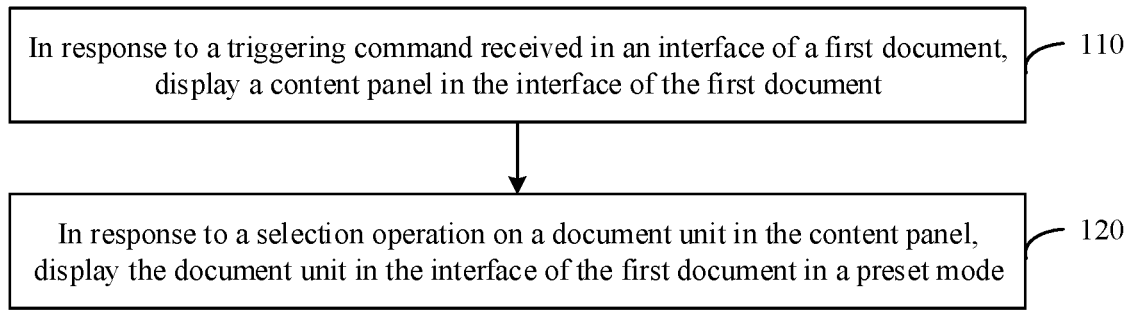
FIG. 1 is a flow chart of a method for document editing according to an embodiment of the present disclosure.

Embodiments of the present disclosure are described in detail below with reference to the drawings. Although some embodiments of the present disclosure are shown in the drawings, it should be understood that the present disclosure may be implemented in various forms and should not be limited to the embodiments set forth herein. In addition, the embodiments are provided for more thoroughly and completely understanding the present disclosure. It should be understood that the drawings and embodiments of the present disclosure are merely exemplary, rather than to limit the protection scope of the present disclosure.

It should be understood that steps recorded in implementations of the method of the present disclosure may be performed in different order and/or simultaneously. Further, the implementations of the method may include additional steps and/or steps performed not shown. The scope of the present disclosure is not limited herein.

The term "including" and variants thereof in the present disclosure are openness including, that is, "including but not limited to". The term "based on" is "based at least in part on". The term "one embodiment" indicates "at least one embodiment". The term "another embodiment" indicates "at least one other embodiment". The term "some embodiments" indicates "at least some embodiments". Relevant definitions of other terms are given in the following description.

It should be noted that concepts of "first" and "second" described in the present disclosure are only used to distinguish different devices, modules or units, and are not used to limit the order or interdependence of functions performed by the devices, modules or units.

It should be noted that modifications of "one" and "multiple" described in the present disclosure are schematic rather than restrictive, and those skilled in the art should understand the "one" and "multiple" as "one or more" unless otherwise clearly indicated in the context.

Names of messages or information exchanged among multiple devices in the embodiments of the present disclosure are only for illustration, rather than to limit the scope of the messages or information.

FIG. 1 is a flow chart of a method for document editing according to an embodiment of the present disclosure. The embodiment may be applied to a situation where a reference object expected by the user is acquired when the user edits a document. The method may be performed by an apparatus for document editing. The apparatus may be formed by hardware and/or software and may normally be integrated in a device with a document editing function. The device may be an electronic device such as a user terminal device. As shown in FIG. 1, the method includes the following steps 110 to 120.

In step 101, in response to a triggering command received in an interface of a first document, a content panel is displayed in the interface of the first document.

The document may be a text document, a table, Power-Point document, or other file. The first document may be a target document that the user expects to edit. The interface may be a display interface that allows the user to edit the first document. The triggering command may be a command for invoking the content panel. The content panel may be a tool panel for performing a reference operation in an editing interface of the document. The content panel displays at least one document unit. The document unit may be a text unit, a table unit, an image unit, and the like. The document unit includes a part of content of a second document.

Specifically, the triggering command received in the interface of the first document may be triggered by the user, or automatically triggered in response to a condition. For example, the user may trigger the command for invoking the content panel by inputting a set invoking character, clicking a set button, inputting a set voice command or other operation. Alternatively, a terminal device may automatically invoke the content panel on receipt of a character related to an object frequently referenced by the user.

In an embodiment, the user may trigger the command for invoking the content panel by inputting the set invoking character, and the terminal device invokes and displays the content panel in response to the command for invoking the content panel.

In the embodiment, in response to the triggering command received in the interface of the first document, the content panel is displayed in the interface of the first document by: displaying the document unit in the interface of the first document in a preset mode. The preset mode includes a reference mode that is different from a manner in which content in the first document is displayed, or a normal mode that is the same as the manner in which content in the first document is displayed.

Specifically, the user may select a manner in which the document unit is displayed in the interface of the first document. For example, the user may select the reference mode that is different from the manner in which the content in the first document is displayed, or may select the normal mode that is the same as the manner in which the content in the first document is displayed.

In the embodiment, before in response to the triggering command received in the interface of the first document, the method further includes: determining that the triggering command is received, on receipt of the set invoking character inputted by the user in an editing interface of a current document.

Specifically, the set invoking character may be a specific character (such as, "@" or "[[") for invoking the content panel set in the terminal device. In the editing interface of the current document, on receipt of the set invoking character inputted by the user (for example, on receipt of a character "@" inputted by the user), it may be determined that an invoking triggering event is generated, that is, the command for invoking the content panel is triggered, and then the content panel may be invoked and displayed for performing subsequent operations.

In an embodiment, other character or shortcut key for invoking the content panel may further be set in the terminal device, or a button for invoking the content panel may be displayed in the editing interface of the document. For example, the user may invoke the content panel by inputting "/" (diagonal tool), clicking on a button "+" in a blank line of the document, setting a shortcut key for invoking the content panel, or the like.

In the editing interface of the current document, the content panel is invoked and displayed in response to the invoking triggering event, so that the content panel can be rapidly invoked in the document, simplifying operations of the user.

In the embodiment, in response to the triggering command received in the interface of the first document, the content panel is displayed in the interface of the first document by: acquiring associated information of the document unit; and displaying the associated information of the document unit on the content panel in a preset way.

The document unit may be a set type of data block or document in a space where the current document is located. The associated information may be information related to the document unit, such as summary information or a title of the document unit.

In an embodiment, the document unit is a set type of data block in another document; or the document unit is a document.

Specifically, the set type of data block is a module in a document. A piece of text, an image, a code, and the like are different types of data blocks. The document is formed by multiple data blocks, and the user may reference a data block in another document. In an embodiment, the user may take a document as a reference object and embed the document in the current document, and consider the referenced document as a data block in the current document.

In an embodiment, before preview information of candidate reference objects is acquired, the method further includes: determining a to-be-previewed candidate reference object in response to an operation command for previewing; or determining a candidate reference object displayed at the top of all the candidate reference objects as a to-be-previewed candidate reference object.

Specifically, the to-be-previewed candidate reference object may be determined in response to the user inputted operation command for previewing the associated information of the candidate reference objects. For example, the to-be-previewed candidate reference object may be determined by the user moving the cursor to a candidate reference object in a list of the candidate reference objects. In a case that no operation command for previewing is inputted by the user, the candidate reference object displayed at the top in the list of the candidate reference objects may be determined as the to-be-previewed candidate reference object.

The associated information of the candidate reference objects is displayed on the content panel in the preset way, and then the candidate reference objects are previewed, so that the user can obtain more relevant information and can conveniently select the expected reference object.

An operation performed by the user on the associated information in the content panel may include clicking an insert button on the panel, double clicking on a candidate reference object, or the like. A reference relationship between the document and the reference object is established by pasting or connecting the reference object to the current document.

Specifically, when a user selects a candidate reference object, the reference relationship between the current document and the reference object is established by clicking the insert button on the panel or double clicking on the selected candidate reference object.

Figure 2:
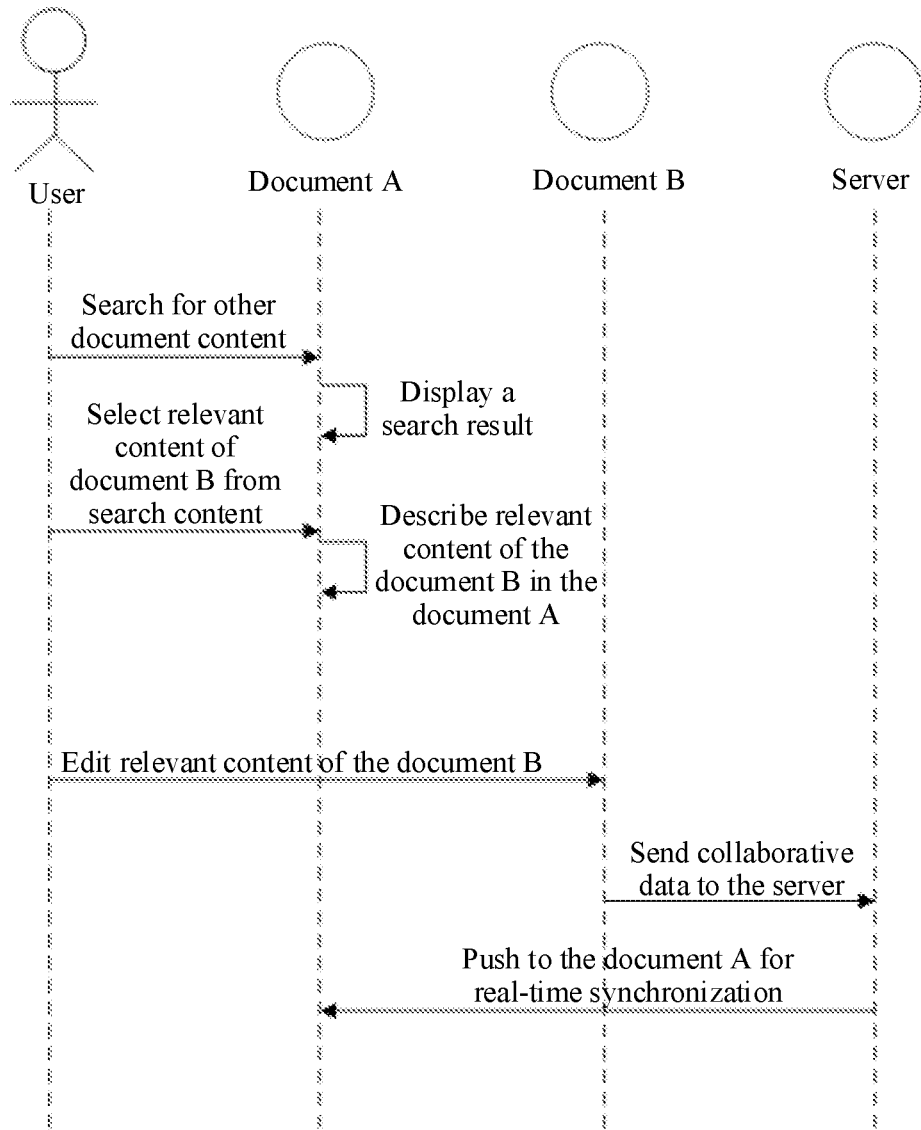
FIG. 2 is a schematic diagram of a low-level interaction process according to an embodiment of the present disclosure.

In an embodiment, FIG. 2 is a schematic diagram of a low-level interaction process according to the embodiment. As shown in FIG. 2, in a document A, a search operation is performed in response to a search character inputted by the user, and document information related to the search character is returned through the list of the candidate reference objects. In a case that the user selects a document B as the reference object, content of the document B is inserted into the document A, and then key information of the referenced document B is described in the document A. The key information includes a source of referenced content, a location of the referenced content in the source document and other information. After the reference is completed, on receiving, in the document A or the document B, user operation of editing real-time referenced content, the document A or the document B pushes an editing command to a server. The server may simultaneously push the relevant editing command to other user terminal devices and update corresponding content in the document A and the document B to achieve collaboration.

In step 120, in response to a selection operation on the document unit in the content panel, the document unit is displayed in the interface of the first document in the preset mode.

The selection operation may include the user moving the cursor to the document unit or clicking on the document unit, or other operation, and the preset mode may be a predetermined manner for displaying the document unit.

Specifically, when the terminal device recognizes that a document unit is selected by the user, the document unit may be displayed in the currently-edited document in the preset mode. In an embodiment, in response to the selection operation on the document unit in the content panel, the document unit is displayed in the interface of the first document in the preset mode by displaying a title of the second document at the top of the document unit; displaying content of the second document below the title; and displaying a reference identifier in the document unit. The reference identifier is used to indicate that the second document is referenced in the first document. The reference identifier may include a vertical line, a text box, distinctively displaying, and the like.

In an embodiment, the title may be clicked to jump to the second document. The user may click on the title at the top of the document unit, and the second document may be jumped to in response to the clicking operation.

In the embodiment, the document is edited by displaying, on the content panel, a creation command control for creating a third document; and creating the third document in response to an operation performed by the user on the creation command control.

The third document may be a new document created by the user.

Specifically, in a case that no document unit is acquired or no document unit is selected by the user, the user may create a new document unit by performing an operation on the creation command control on the content panel. For example, after the content panel is invoked, if a relevant data block or document is not found after the search operation is performed in response to the search character inputted by the user, the creation command control may be displayed, so that the user can create a new object. In an embodiment, the search character may be defaulted to be a title of the newly-created document unit.

In an embodiment, in response to the operation performed by the user on the creation command control, the third document may be created by displaying the third document or a document unit of the third document in the first document in the preset mode.

Specifically, after the third document is created, the created third document or the document unit of the third document may be displayed in the first document.

In the embodiment, the method for document editing may further include: in response to an editing command received in the interface of the first document, displaying the content panel in the interface of the first document, where the content panel displays editing prompt information.

Specifically, after the second document is referenced in the first document, on receipt of the operation of editing real-time referenced content by the user in the first document or the second document, an editing command is pushed to the server, and the server simultaneously push the relevant editing command to other user terminal devices, thus achieving the collaboration.

According to the embodiments of the present disclosure, in response to the triggering command received in the interface of the first document, the content panel is displayed in the interface of the first document, where the content panel displays at least one document unit, and the document unit includes a part of content of the second document. Then, in response to the selection operation on the document unit in the content panel, the document unit is displayed in the interface of the first document in the preset mode, where the preset mode is different from a manner in which the content in the first document is displayed. In the method for document editing according to the embodiments of the present disclosure, the content panel can be rapidly invoked in the document and objects allowing to be referenced are displayed in the content panel, simplifying the operations of the user and improving the user experience.

Figure 3:
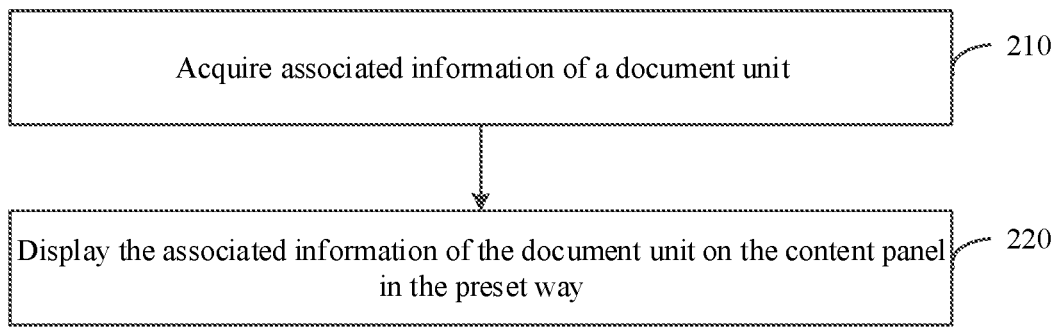
FIG. 3 is a flow chart of a method for displaying a content panel according to an embodiment of the present disclosure.

FIG. 3 is a flow chart of a method for displaying a content panel according to an embodiment of the present disclosure. The embodiment may be applied to a situation where after the content panel is invoked, the document unit and the associated information of the document unit are acquired and then displayed according to a preset strategy. As shown in FIG. 3, the method includes the following steps 210 to 220.

In step 210, the associated information of the document unit is acquired.

The associated information of the document unit may be information related to the document unit (such as summary information or a title of the document unit). The associated information of the document unit may be acquired by reading content of the document unit and extracting information in the content. For example, the associated information may be acquired by extracting the title of the document or extracting the first line of text content in a data block.

In the embodiment, the associated information of the document unit may be acquired by: receiving, in the content panel, the search character inputted by the user, and determining the document unit according to the search character; or determining the document unit based on a preset recommendation strategy, in a case of identifying that a search character field is empty.

After the content panel is invoked, the character inputted by the user may serve as the search character.

In an embodiment, after the content panel is invoked, the search character inputted by the user may be received, the space where the current document is located is searched according to the search character to determine the document unit based on a set search strategy. In a case that no search character is inputted by the user, the document unit may be determined based on the preset recommendation strategy.

The associated information of document units of the candidate reference objects is acquired, so that the reference objects required by the user can be more intuitively presented to the user, and it is more convenient for the user to determine a reference object.

Specifically, after the content panel is invoked, search is performed in according to the search character inputted by the user, and the found relevant data block or the document serves as the candidate reference object. For example, in a case that the user invokes the content panel by using the set invoking character, a character inputted following the set invoking character may serve as the search character, and then candidate reference objects that can be referenced may be searched for according to the search character. In an embodiment, if no search character is inputted by the user, the candidate reference objects may be determined based on the preset recommendation strategy. After the candidate reference objects are determined, the candidate reference objects may be presented in a list in the content panel.

In an embodiment, the content of the content panel may be displayed in an order of sorting according to the types of the author, the document, the operation, and data block. For example, in a case that the user inputs a search character of "hi", the content panel preferentially displays document(s) with an author name including "hi", then displays document(s) with a title including "hi", and then displays a creation command control for creating a reference object, finally, displays data block(s) including "hi". In a case that there is no data corresponding to one type, for example, the type does not match the search character, the type is not displayed.

The preset recommendation strategy may include recommending based on objects recently referenced in the current document, recommending based on content recently browsed by the user, or other ways.

Specifically, after the content panel is invoked, in a case that no search character is inputted by the user, and the terminal device recognizes that the search character field is empty, the candidate reference object may be determined based on the preset recommendation strategy.

Figure 4:
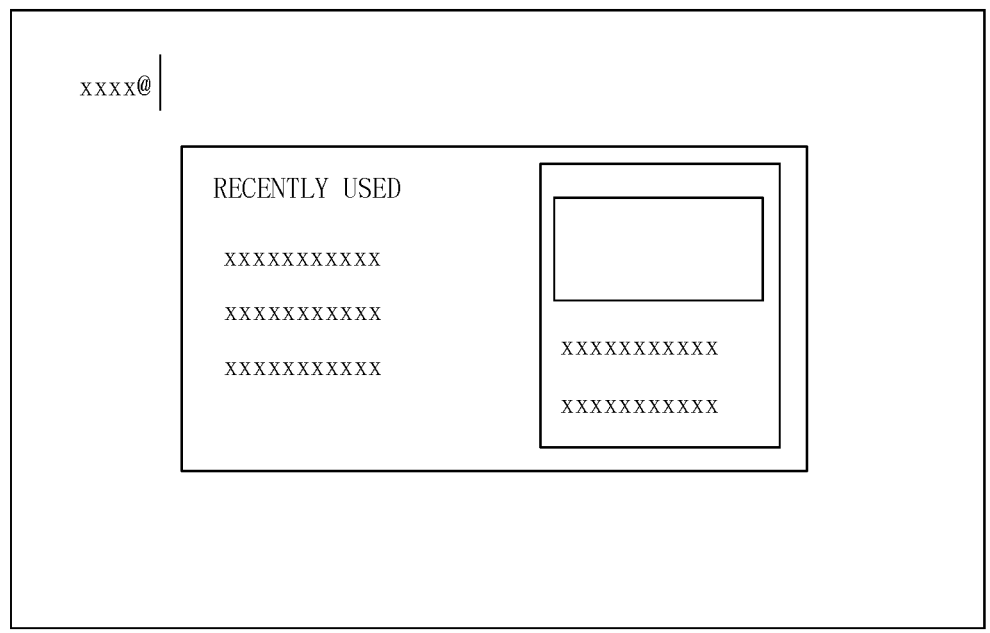
FIG. 4 is a schematic diagram of a recommendation strategy according to an embodiment of the present disclosure.

FIG. 4 is a schematic diagram of a recommendation strategy according to an embodiment of the present disclosure. As shown in FIG. 4, the content panel displays objects recently browsed by the user. In an embodiment, a search range of the recommendation strategy may include all members, documents, and data blocks in the space where the current document is located. The recommendation strategy may include as follows.

(1) Author
  1) The user is defaulted to be a first item on a recommendation list.
  2) Authors recently mentioned by the user are sorted in a reverse chronological order, and person that is the most recently mentioned is ranked at the top.
  3) Collaborators of the current document are preferentially ranked, and then other members are ranked.
  4) Authors are sorted in a descending order based on relevance between the current document and the authors.

(2) Document
  1) Documents (that is, content displayed in "RENTLY USED" as shown in FIG. 4) recently browsed by the user are sorted in the reverse chronological order, and a document that is the most recently mentioned is ranked at the top.
  2) The candidate reference documents are sorted in the descending order based on relevance between the candidate reference documents and the current document, and relevance between the candidate reference documents and the user of the current document.

(3) Data Block
  1) Data blocks in documents recently browsed by the user are sorted in the reverse chronological order, and a data block in a document that is the most recently mentioned is ranked at the top.
  2) Data blocks are sorted in the descending order based on relevance between the candidate reference documents and the current document, relevance between the candidate reference documents and the user of the current document, relevance between candidate reference blocks and the current document, and relevance between the candidate reference blocks and the author of the current document.

In step 220, the associated information of the document unit is displayed on the content panel in the preset way.

The associated information of the document unit may be information related to the document unit, such as summary information or a title.

After the associated information of the document unit is acquired, the associated information may be displayed on the content panel in the preset way. The preset way may be a list, a grid, a carousel diagram, a swimlane, a card, text, or other ways. The associated information may be the summary information of the document unit.

In the embodiment, the associated information of the document unit is displayed on the content panel in the preset way by displaying summary information of multiple document units in a list on the content panel.

In an embodiment, after the document units are determined, the summary information of multiple document units may be displayed in the list on the content panel. The list may include plain text or include icons together with texts, or include images together with titles. The user may view more content by swiping the list.

In an embodiment, the summary information of the document unit may further be displayed in other manners. For example, the summary information of the document unit may be tiled on the content panel in a grid. The grid may display texts, images or other content. The user may view the portions of the grid not displayed on the content panel by swiping the grid.

In an embodiment, after the associated information of the candidate reference objects is displayed, an object selected by the user may be previewed in response to an operation of the user.

In the embodiment, after the associated information of the document unit is displayed on the content panel in the preset way, the method may further include: acquiring preview information of the document unit in response to an operation command for previewing the associated information of the document unit inputted by the user; and displaying the preview information.

The user may input the operation command for previewing the associated information of the document unit by moving the cursor to a document unit in a list of the document units or clicking on the document unit. For example, when the user moves the cursor to a document unit in the list of the candidate objects, preview information of the document unit may be displayed.

In an embodiment, the preview information may be displayed in the way of displaying the preview information in an extension area of the content panel, where the preview information includes the content of the document unit and content associated with the document unit in the second document.

Figure 5:
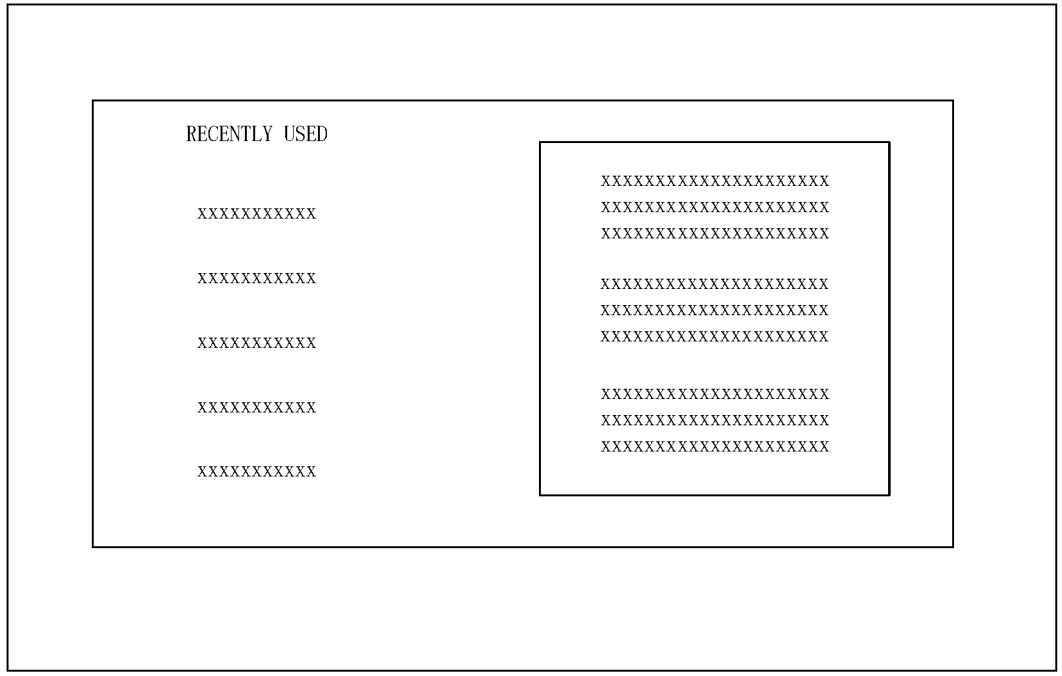
FIG. 5 is a schematic diagram of display manner of preview information according to an embodiment of the present disclosure.

FIG. 5 is a schematic diagram of display manner of preview information according to an embodiment of the present disclosure. As shown in FIG. 5, the extension area independent of the content panel may be created. The extension area may be a floating window, and content of the floating window is the preview information of the document unit. The preview information includes at least part of the content of the document unit, in which the search character and a data block including the search character may be distinctively displayed, and the data block matching the search character may be displayed in the middle of the floating window, so as to facilitate the display of a preceding section and a succeeding section of the data block in the floating window. In an embodiment, a scroll bar may be arranged on the floating window, so that the user can view more content by scrolling the scroll bar. In a case that content of the candidate reference object cannot be entirely displayed in the floating window, the user may view the content entirely by opening a document where the candidate reference object is located. In an embodiment, in a case that a candidate reference object is a non-existent object, a floating window without any content may be displayed during preview, that is, there is no preview information.

In an embodiment, in addition to the context, more information may be displayed in the floating window in order to facilitate the user positioning. In a case that the document unit is a document, a creator of the document, a contributor (who edited the document) of the document, a time instant when the document is created, a time instant when the document is edited last and other information may be displayed in the floating window. In a case that the candidate reference object is a data block, a creator of the data block, a contributor (who edited the data block) of the data block, a time instant when the data block is created, a time instant when the data block is edited last, the number of times the data block is referenced, documents that reference the data block and other information may be displayed in the floating window.

In an embodiment, the preview information is displayed in a way of displaying the preview information in the extension area of the content panel, where the preview information includes the content of the document unit and the content associated with the document unit in the second document.

According to the embodiment of the present disclosure, the associated information of the document unit is acquired, and then the associated information of the document unit is displayed on the content panel in the preset way. In the method for displaying a content panel according to the embodiment of the present disclosure, in a case that a search character is inputted by the user, a search operation is performed in response to the search character; and in a case that no search character is inputted by the user, candidate reference objects are determined based on the preset recommendation strategy. Finally, the determined candidate reference objects are sorted and displayed according to a rule, so as to preferentially display an object that the user is most likely to reference, so that it is more convenient for the user to reference the object.

Figure 6:
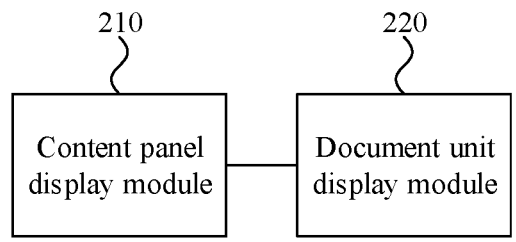
FIG. 6 is a schematic structural diagram of an apparatus for document editing according to an embodiment of the present disclosure.

FIG. 6 is a schematic structural diagram of an apparatus for document editing according to an embodiment of the present disclosure. As shown in FIG. 6, the apparatus includes a content panel display module 210 and a document unit display module 220.

The content panel display module 210 is configured to, in response to a triggering command received in an interface of a first document, display a content panel in the interface of the first document.

The content panel displays at least one document unit, and the document unit includes a part of content of a second document.

In an embodiment, the content panel display module 210 is further configured to display the document unit in the interface of the first document in a preset mode. The preset mode includes a reference mode that is different from a manner in which content in the first document is displayed, or a normal mode that is the same as a manner in which content in the first document is displayed.

In an embodiment, the content panel display module 210 is further configured to acquire associated information of the document unit; and display the associated information of the document unit on the content panel in a preset way.

In an embodiment, the content panel display module 210 is further configured to receive a search character inputted by the user in the content panel, and determine the document unit by performing search according to the search character; or determine the document unit based on a preset recommendation strategy, in a case of identifying that a search character field is empty.

In an embodiment, the content panel display module 210 is further configured to display summary information of multiple document units in a list on the content panel.

The document unit display module 220 is configured to, in response to a selection operation on the document unit in the content panel, display the document unit in the interface of the first document in a preset mode.

In an embodiment, the document unit display module 220 is further configured to, display a title of the second document at the top of the document unit; display content of the second document below the title; and display a reference identifier in the document unit, where the reference identifier is used to indicate that the second document is referenced in the first document.

In an embodiment, the document unit display module 220 is further configured to open the second document in response to a triggering operation on the title.

In an embodiment, the apparatus further includes a creation command control display module and a third document creation module.

The creation command control display module is configured to display a creation command control for creating a third document on the content panel.

The third document creation module is configured to create the third document in response to an operation performed by the user on the creation command control.

In an embodiment, the third document creation module is further configured to display the third document or a document unit of the third document in the first document in the preset mode.

In an embodiment, the apparatus further includes a preview information acquiring module and a preview information display module.

The preview information acquiring module is configured to acquire preview information of the document unit in response to an operation command for previewing the associated information of the document unit inputted by the user The preview information display module is configured to display the preview information.

In an embodiment, the preview information display module is further configured to display the preview information in an extension area of the content panel, where the preview information includes the content of the document unit and content associated with the document unit in the second document.

In an embodiment, the apparatus further includes a second content panel display module. The second content panel display module is configured to in response to an editing command received in the interface of the first document, display the content panel in the interface of the first document, where the content panel displays editing prompt information.

The above apparatus may implement the method according to any one of the embodiments of the present disclosure, and has the same functions and beneficial effects as the method. For technical details not described in detail in this embodiment, reference may be made to the method according to the foregoing embodiments.

Hereinafter, reference is made to FIG. 7, which is a schematic structural diagram of an electronic device 300 according to an embodiment of the present disclosure. The electronic device according to the embodiment of the present disclosure may include, but is not limited to, a mobile terminal, such as a mobile phone, a laptop, a digital broadcast receiver, a personal digital assistant (PDA), a portable android device (PAD), a portable multimedia player (PMP), a vehicle-mounted terminal (such as in-vehicle navigation terminal); a fixed terminal, such as a digital TV and a desktop computer; or various servers, such as an independent server or a server cluster. The electronic device shown in FIG. 7 is only exemplary, and should not indicate any limitation to the function and scope of application of the embodiments of the present disclosure.

Figure 7:
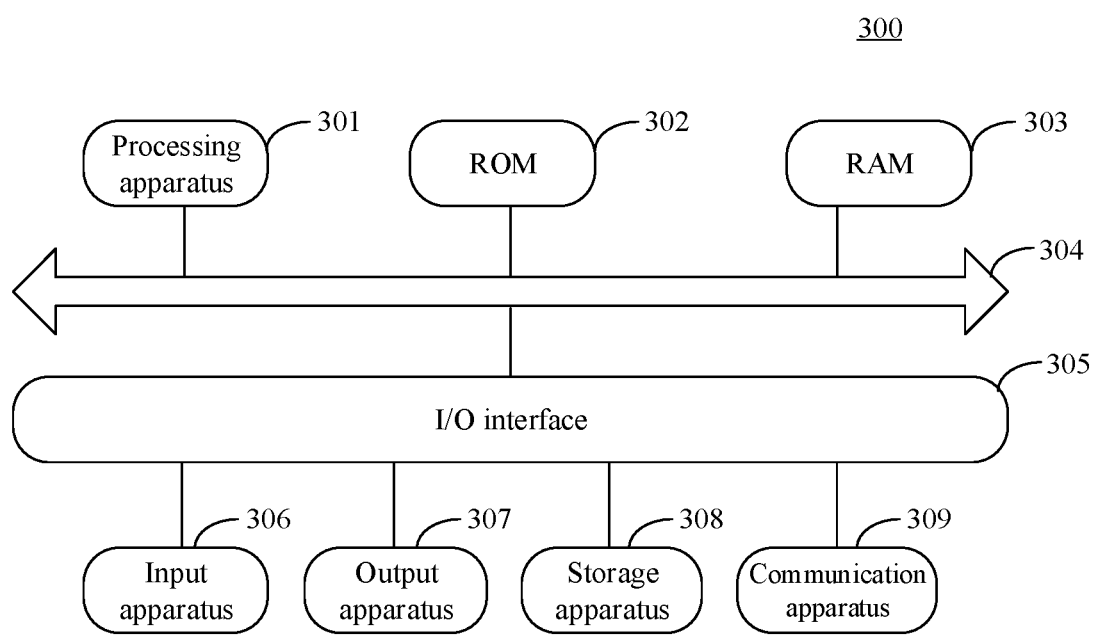
FIG. 7 is a schematic structural diagram of an electronic device according to an embodiment of the present disclosure.

As shown in FIG. 7, the electronic device 300 may include a processing apparatus (such as a central processing unit or a graphics processor) 301, which may execute various operations and processing based on a program stored in a read-only memory (ROM) 302 or a program loaded from a storage apparatus 305 into a random-access memory (RAM) 303. The RAM 303 is further configured to store various programs and data required by the electronic device 300. The processing apparatus 301, the ROM 302 and the RAM 303 are connected to each other through a bus 304. An input/output (I/O) interface 305 is also connected to the bus 304.

Generally, the I/O interface 305 may be connected to: an input apparatus 306, such as a touch screen, a touch panel, a keyboard, a mouse, a camera, a microphone, an accelerometer, and a gyroscope; an output apparatus 307, such as a liquid crystal display (LCD), a speaker, and a vibrator; a storage apparatus 308 such as a magnetic tape and a hard disk; and a communication apparatus 309. The communication apparatus 309 enables wireless or wired communication between the electronic device 300 and other devices for data exchanging. Although FIG. 7 shows an electronic device 300 having various apparatuses, it should be understood that the illustrated apparatuses are not necessarily required to all be implemented or embodied. Alternatively, more or fewer apparatuses may be implemented or included.

Particularly, according to an embodiment of the present disclosure, the process described above in conjunction with flow charts may be implemented as a computer software program. For example, a computer program product is further provided according to an embodiment of the present disclosure. The computer program product includes a computer program carried on a computer-readable medium. The computer program includes program codes for performing the method for document editing. In the embodiment, the computer program may be downloaded and installed from the network via the communication apparatus 309, or installed from the storage apparatus 305, or installed from the ROM 302. When the computer program is executed by the processing apparatus 301, the functions defined in the method according to the embodiments of the present disclosure are performed.

It should be noted that, the computer-readable medium in the present disclosure may be a computer-readable signal medium or a computer-readable storage medium or any combination thereof. The computer-readable storage medium may include, but is not limited to, a system, an apparatus, or a device in an electronic, magnetic, optical, electromagnetic, infrared, or semi-conductive form, or any combination thereof. Concrete examples of the computer-readable storage medium may include, but is not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device or any suitable combination thereof. In the present disclosure, the computer-readable storage medium may be any tangible medium including or storing a program, and the program may be used by or used in combination with an instruction execution system, apparatus, or device. In the present disclosure, the computer-readable signal medium may be a data signal in a baseband or transmitted as a part of a carrier wave and carrying computer-readable program codes. The transmitted data signal may be in various forms, including but not limited to an electromagnetic signal, an optical signal or any proper combination thereof. The computer-readable signal medium may alternatively be any computer-readable medium other than the computer-readable storage medium. The computer-readable signal medium may send, propagate or transmit a program for use by or use in combination with an instruction execution system, apparatus or a component. The program codes stored in the computer-readable medium may be transmitted via any proper medium including but not limited to: a wire, an optical cable, radio frequency (RF) and the like, or any proper combination thereof.

In some embodiments, a user terminal and a server may communicate in any currently known or future developed network protocol such as a hypertext transfer protocol (HTTP), and may be interconnected with any form or medium of digital data communication (for example, communication network). The communication network includes, for example, a local area network (LAN), a wide area network (WAN), an Internet network (for example, the Internet), and an end-to-end network (for example, an ad hoc end-to-end network), and any currently known or future developed network.

The computer-readable medium may be included in the electronic device, or may exist alone without being assembled into the electronic device.

The computer-readable medium carries one or more programs. When the one or more programs are executed by the electronic device, the electronic device receives a service request sent by the user terminal device, where the service request carries a request identifier; acquires stored historical request data based on the request identifier, if the server fails; and sends the historical request data to the user terminal device.

The computer program codes for performing the operations in the present disclosure may be written in one or more programming languages or combinations thereof. The programming languages include, but are not limited to, an object-oriented programming language, such as Java, Smalltalk, and C++, and a conventional procedural programming language, such as C language or a similar programming language. The program codes may be entirely executed on a user computer, partially on the user computer, as a stand-alone software package, partially on the user computer and partially on a remote computer, or entirely on the remote computer or a server. In the case of involving a remote computer, the remote computer may be connected to a user computer or an external computer through any kind of network including the local area network (LAN) or the wide area network (WAN) (for example, the remote computer may be connected to the user computer or the external computer through Internet connection by an Internet service provider).

Flow charts and block diagrams in the drawings show architecture, functions and operations that can be implemented by the system, method and computer program product according to the embodiments of the present disclosure. Each block in the flow charts or the block diagrams may represent a module, a program segment, or a part of codes, and the module, the program segment, or the part of codes includes one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should be noted that each block in the block diagrams and/or the flow charts and a combination of blocks in the block diagrams and/or the flow charts may be implemented by using a dedicated hardware-based system for performing a specified function or operation, or may be implemented by using a combination of dedicated hardware and a computer instruction.

The units mentioned in the description of the embodiments of the present disclosure may be implemented by means of software, or otherwise by means of hardware. In some circumstances, names of units do not constitute a limitation on the units themselves.

The functions described above in the present disclosure may be performed at least partially by one or more hardware logic components. For example, without limitation, exemplary types of hardware logic components that may be used include: field programmable gate array (FPGA), application specific integrated circuit (ASIC), application specific standard product (ASSP), system on chip (SOC), complex programmable logic device (CPLD) and the like.

In the context of the present disclosure, a machine-readable medium may be a tangible medium including or storing a program that is used by or used in combination with an instruction execution system, apparatus or device. The machine-readable medium may be a machine-readable signal medium or a machine-readable storage medium. The machine-readable medium may include, but is not limited to, a system, an apparatus or a device in an electronic, magnetic, optical, electromagnetic, infrared, or semi-conductive form, or any combination thereof. Concrete examples of the machine-readable storage medium may include, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device or any suitable combination thereof.

According to one or more embodiments of the present disclosure, a method for document editing is provided. The method includes:

in response to a triggering command received in an interface of a first document, displaying a content panel in the interface of the first document, where the content panel displays at least one document unit, and the document unit includes a part of content of a second document; and in response to a selection operation on the document unit in the content panel, displaying the document unit in the interface of the first document in a preset mode.

In an embodiment, the in response to a triggering command received in an interface of a first document, displaying a content panel in the interface of the first document includes:

displaying the document unit in the interface of the first document in the preset mode, where the preset mode includes a reference mode that is different from a manner in which content in the first document is displayed, or a normal mode that is the same as a manner in which content in the first document is displayed.

In an embodiment, the in response to a triggering command received in an interface of a first document, displaying a content panel in the interface of the first document includes:
acquiring associated information of the document unit; and
displaying the associated information of the document unit on the content panel in a preset way.

In an embodiment, the method for document editing further includes
receiving, in the content panel, a search character inputted by the user, and determining the document unit according to the search character; or
determining the document unit based on a preset recommendation strategy, in a case of identifying that a search character field is empty.

In an embodiment, after the displaying the associated information of the document unit on the content panel in a preset way, the method further includes:
acquiring preview information of the document unit in response to an operation command for previewing the associated information of the document unit inputted by the user; and
displaying the preview information.

In an embodiment, the displaying the preview information includes: displaying the preview information in an extension area of the content panel, where the preview information includes the content of the document unit and content associated with the document unit in the second document.

In an embodiment, the displaying the associated information of the document unit on the content panel in a preset way includes: displaying summary information of multiple document units in a list on the content panel.

In an embodiment, the in response to a selection operation on the document unit in the content panel, displaying the document unit in the interface of the first document in a preset mode includes:
displaying a title of the second document at the top of the document unit;
displaying content of the second document below the title; and
displaying a reference identifier in the document unit, where the reference identifier is used to indicate that the second document is referenced in the first document.

In an embodiment, after the in response to a selection operation on the document unit in the content panel, displaying the document unit in the interface of the first document in a preset mode, the method further includes opening the second document in response to a triggering operation on the title.

In an embodiment, the method further includes: displaying, on the content panel, a creation command control for creating a reference object; and creating a third document in response to an operation performed by the user on the creation command control.

In an embodiment, the creating a third document in response to an operation performed by the user on the creation command control includes displaying the third document or a document unit of the third document in the first document in the preset mode.

In an embodiment, the method further includes: in response to a received editing command on the document unit, updating content of the document unit in the first document and the second document based on the editing command.

It should be noted that the above descriptions show only some preferred embodiments and technical principles of the present disclosure. Those skilled in the art should understand that the present disclosure is not limited to the embodiments described above. Those skilled in the art may make various variations, modifications and substitutions without departing from the protection scope of the present disclosure. Therefore, although the present disclosure is described in detail with the above embodiments, the present disclosure is not limited to the above embodiments. The present disclosure may further include more other equivalent embodiments without departing from the concept of the present disclosure, and the present disclosure should fall within the scope of the claims.

The invention claimed is:

1. A method for document editing, applied in an electronic device with a processor and a display, comprising:
in response to a triggering command received by the processor in an interface of a first document, calling and displaying, on the display of the electronic device, a content panel in the interface of the first document;
determining, by the processor, candidate reference objects, wherein
the candidate reference objects comprise at least one document unit, and
the document unit comprises a part of content of a second document;
displaying the candidate reference objects in the content panel for selection by a user; and
in response to receiving by the processor, an operation of the user to select the document unit among the candidate reference objects in the content panel, displaying, on the display of the electronic device, the document unit in the interface of the first document in a preset mode; and
in response to failing in determining the candidate reference objects or in response to not receiving the operation of the user to select the document unit among the candidate reference objects in the content panel, displaying a creation command control in the content panel, wherein the creation command control is used for triggering creation of a new third document.

2. The method according to claim 1, wherein the preset mode comprises a reference mode that is different from a manner in which the content in the first document is displayed, or a normal mode that is a same as the manner in which the content in the first document is displayed.

3. The method according to claim 1, wherein in response to the triggering command received in the interface of the first document, displaying the content panel in the interface of the first document comprises:
acquiring, by the processor, associated information of the document unit; and
displaying, on the display of the electronic device, the associated information of the document unit on the content panel in a preset way.

4. The method according to claim 1, further comprising:
receiving by the processor, in the content panel, a search character inputted by the user, and determining by the processor, the candidate reference objects according to the search character; or
determining by the processor, the candidate reference objects based on a preset recommendation strategy, in a case of identifying that a search character field is empty.

5. The method according to claim 3, wherein after the displaying the associated information of the document unit on the content panel in the preset way, the method further comprises:

acquiring preview information of the document unit in response to an operation command for previewing the associated information of the document unit inputted by the user; and displaying the preview information.

6. The method according to claim 5, wherein the displaying the preview information comprises:

displaying, on the display of the electronic device, the preview information in an extension area of the content panel, wherein the preview information comprises a content of the document unit and a content of the second document, which is associated with the document unit.

7. The method according to claim 3, wherein the displaying the associated information of the document unit on the content panel in the preset way comprises:

displaying summary information of a plurality of document units in a list on the content panel.

8. The method according to claim 1, wherein in response to a selection operation on the document unit, performed in the content panel, displaying the document unit in the interface of the first document in the preset mode comprises:

displaying, on the display of the electronic device, a title of the second document on top of the document unit;

displaying, on the display of the electronic device, content of the second document below the title; and displaying, on the display of the electronic device, a reference identifier in the document unit, wherein the reference identifier is used to indicate that the second document is referenced in the first document.

9. The method according to claim 8, further comprising:

opening, by the processor, the second document in response to a triggering operation on the title.

10. The method according to claim 1, further comprising:

creating, by the processor, the third document in response to an operation performed by the user on the creation command control.

11. The method according to claim 10, wherein the creating the third document in response to the operation performed by the user on the creation command control comprises:

displaying the third document or a document unit of the third document in the first document in the preset mode.

12. The method according to claim 1, further comprising:

in response to a received editing command on the document unit, updating, by the processor, content of the document unit in the first document and the second document based on the editing command.

13. An electronic device, comprising:

a display;

one or more processors; and a memory, configured to store one or more instructions, wherein the one or more instructions, when being executed by the one or more processors, cause the one or more processors to perform:

in response to a triggering command received by the processor in an interface of a first document, calling and displaying, on the display of the electronic device, a content panel in the interface of the first document, determining candidate reference objects, wherein the candidate reference objects comprise at least one document unit, and the document unit comprises a part of content of a second document;

displaying the candidate reference objects in the content panel for selection by the user;

in response to receiving by the processor, an operation of the user to select the document unit among the candidate reference objects in the content panel, displaying, on the display of the electronic device, the document unit in the interface of the first document in a preset mode; and in response to failing in determining the candidate reference objects or in response to not receiving the operation of the user to select the document unit among the candidate reference objects in the content panel, displaying a creation command control in the content panel, wherein the creation command control is used for triggering creation of a new third document.

14. The electronic device according to claim 13, wherein the one or more processors are further caused to perform:

displaying, on the display of the electronic device, the document unit in the interface of the first document in the preset mode, wherein the preset mode comprises a reference mode that is different from a manner in which the content in the first document is displayed, or a normal mode that is a same as the manner in which the content in the first document is displayed.

15. The electronic device according to claim 13, wherein the one or more processors are further caused to perform:

acquiring associated information of the document unit; and displaying, on the display of the electronic device, the associated information of the document unit on the content panel in a preset way.

16. The electronic device according to claim 13, wherein the one or more processors are further caused to perform:

receiving, in the content panel, a search character inputted by the user, and determining the candidate reference objects according to the search character; or determining the candidate reference objects based on a preset recommendation strategy, in a case of identifying that a search character field is empty.

17. The electronic device according to claim 15, wherein the one or more processors are further caused to perform:

acquiring preview information of the document unit in response to an operation command for previewing the associated information of the document unit inputted by the user; and displaying, on the display of the electronic device, the preview information.

18. The electronic device according to claim 17, wherein the one or more processors are further caused to perform:

displaying, on the display of the electronic device, the preview information in an extension area of the content panel, wherein the preview information comprises a content of the document unit and a content in the second document, which is associated with the document unit.

19. The electronic device according to claim 13, wherein the one or more processors are further caused to perform:

displaying, on the display of the electronic device, a title of the second document on top of the document unit;

displaying, on the display of the electronic device, content of the second document below the title; and displaying, on the display of the electronic device, a reference identifier in the document unit, wherein the reference identifier is used to indicate that the second document is referenced in the first document.

20. A non-transitory computer-readable storage medium, storing a computer program, wherein the computer program, when being executed by a processor of an electronic device with a display, implements:

in response to a triggering command received by the processor in an interface of a first document, calling and displaying, on the display of the electronic device, a content panel in the interface of the first document;

determining, by the processor, candidate reference objects,
wherein the candidate reference objects comprise at least one document unit, and the document unit comprises a part of content of a second document;

displaying the candidate reference objects in the content panel for selection by the user;

in response to receiving by the processor, an operation of the user to select the document unit among the candidate reference objects in the content panel, displaying, on the display of the electronic device, the document unit in the interface of the first document in a preset mode; and in response to failing in determining the candidate reference objects or in response to not receiving the operation of the user to select the document unit among the candidate reference objects in the content panel, displaying a creation command control in the content panel, wherein the creation command control is used for triggering creation of a new third document.

* * * * *